United States Patent Office 3,531,817
Patented Oct. 6, 1970

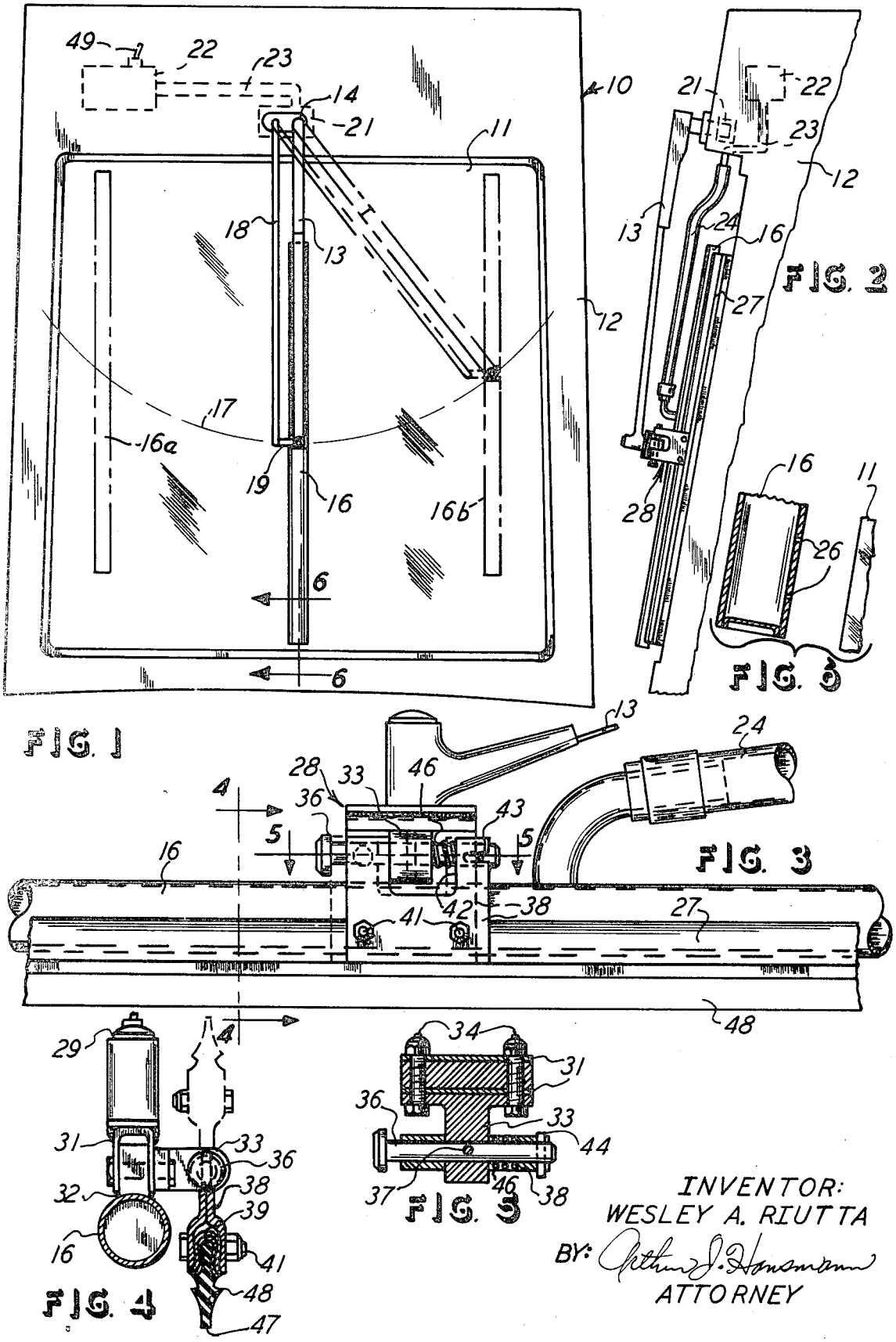

3,531,817
VEHICLE WINDSHIELD CLEANER
Wesley A. Riutta, Kenosha, Wis., assignor to J. I. Case Company, Racine, Wis., a corporation of Wisconsin
Filed Sept. 23, 1968, Ser. No. 761,559
Int. Cl. B60s *1/54*
U.S. Cl. 15—250.04   3 Claims

ABSTRACT OF THE DISCLOSURE

A vehicle windshield cleaner having an air conduit reciprocally mounted for movement across the windshield in a position spaced therefrom and having an air supply and air holes for blowing air onto the windshield to remove the dust from the windshield. A windshield wiper blade is shown attached with the air conduit so that the two reciprocate together. The attachment is such that the wiper blade can be moved from a position of wiping contact with the windshield to a position spaced clear of the windshield.

Background of the invention

This invention relates to a vehicle windshield cleaner of the mechanical type for reciprocation across a vehicle windshield. It is common practice to provide a wiper blade slidably operable on a vehicle windshield for wiping water from the windshield. The blade may also be used for wiping dry particles from the windshield, such as dust. However, many forms of dust and many conditions relative to the deposit on the windshield cause the wiper blade to smear the windshield when the blade is used without a liquid such as cleaning water. Further, to provide a windshield cleaner mechanism which includes a water supply and sprayer is requiring a complicated and expensive structure for the purpose of washing a windshield in conjunction with the use of the wiper blade. Even when a liquid cleaner is used with the wiper blade, the windshield is not always cleaned but is sometimes streaked because of the liquid cleaner or because of the particular drainage and air flow across the windshield.

The present invention recognizes the problem of removing dust from the windshield, and doing so without leaving the windshield streaked or smeared from any deposit which was on the windshield. This problem exists especially in agricultural vehicles which are used under dusty field conditions. It is then desirable to remove the dust from the windshield, but to do so without requiring a windshield washer and its water supply, and without the probability of leaving the windshield smeared even when a washer is used.

Further, the invention recognizes a concern for providing a mechanical type of windshield cleaner which can be used along with the operation of the windshield wiper blade in that a cleaner mechanism can be mounted with the blade, and the blade can be readily positioned in either an operative position against the windshield, or it can be positioned in an inoperative position spaced from the windshield to permit the mechanical cleaner to remove the dust without physically contacting the windshield. This particular object is accomplished by the use of an air blower or supply and an air conduit which is spaced from the windshield and reciprocates along with the reciprocation of the wiper blade, though the air released from the conduit and onto the windshield is released at a time that the wiper blade is spaced clear of the windshield.

Brief description of the drawing

FIG. 1 is a front elevational view of one form of a windshield cleaner of this invention.

FIG. 2 is a side elevational view of a portion of FIG. 1, but with a wiper blade added thereto.

FIG. 3 is an enlarged side elevational view of a central portion of FIG. 2.

FIG. 4 and FIG. 5 are sectional views taken on the lines 4—4 and 5—5, respectively, of FIG. 3.

FIG. 6 is an enlarged sectional view taken on the line 6—6 of FIG. 1.

Detailed description of the preferred embodiment

This invention has particular application in agricultural vehicles which are used in the field, and it is particularly significant when there is dust in the air, and this dust is settling on the vehicle windshield. A portion designated 10 of an agricultural vehicle is shown in the drawings, and of course the portion 10 could be of any type of vehicle. A windshield 11 is included in the portion 10, and it is surrounded by a rigid structure 12, all in a conventional arrangement. An arm 13 is pivotally mounted to extend across a portion of the windshield 11, and it is shown mounted in a mounting block 14 on the vehicle. An air tube or conduit 16 is suitably connected to the lower end of the arm 13, and the conduit 16 therefore reciprocates or pivots along with the pivoting of the arm 13 about the mounting block 14. Such pivotal action is shown by the dotted arch designated 17, and the dot-dash lines designated 16a and 16b show other positions for the air conduit 16, which positions are taken by the air conduit 16 upon its pivotal motion mentioned. Another arm 18 is also pivotally supported in the block 14 and extends to a connector 19, just as the end of the arm 13 also extends, and the arms 13 and 18 therefore provide a type of parallelogram structure which permits the reciprocal or pivotal motion of the conduit 16 without having the conduit 16 pivot about a fixed point on the block 14, and this arrangement is of a conventional nature also, relative to the arms 13 and 18 when used for a wiper blade.

FIGS. 1 and 2 further show that a motor designated 21 is disposed on the vehicle portion 10 and is connected to the arm 13 for pivoting the latter in a conventional manner. Further, an air blower 22 and an air line 23 are connected to the air conduit 16 to supply pressurized air to the interior of the hollow air conduit 16. FIG. 2 further shows a flexible connecting line 24 which is connected to the line 23 and to the conduit 16 for directing the output of the blower 22 into the air conduit 16.

In this manner, and with the structure described at this point, it will therefore be understood that the blower 22 conducts pressurized air into the air conduit or tube 16, and the tube 16 is reciprocally mounted in spaced relation to the windshield 11, and FIG. 6 shows the conduit 16 has air holes 26 on the portion thereof closest to the windshield 11. Therefore, pressurized air is directed against the windshield 11 as it passes through the air exhaust 26. In this manner, dust is blown from the windshield 11.

It is desirable to mount the air conduit 16 on the arm 13 which normally also supports the windshield wiper blade. Thus, a wiper blade 27 is connected to the arm 13 through the mounting and connecting block 28 extending between the arm 13 and the conduit 16 and the wiper blade 27. Thus, the arm 13 and mounting block 28 are connected through a pin 29 which permits the relative rotation between the arm 13 and the block 28, as shown by the dot-dash lines in FIG. 1. The block 28 includes a U-shaped bracket 31 which has the air conduit 16 secured therebelow, as by welding at 32. The bracket 31 also supports an arm 33 projecting to one side of the bracket 31, as shown in FIG. 4. Bolts 34 connect the arm 33 with the bracket 31. Arm 33 has a pin 36 affixed thereto by means of a roll pin 37. A bracket 38 receives the pin 36, as shown in FIG. 5, and the bracket 38 is connected to the metal backing 39 extending along the wiper blade 27, and the connection is by bolts 41. The bracket 38 has an opening 42 which receives the arm 33, and FIG. 3 shows a spacing between the arm 33 and the bracket 38 such that the bracket 38 can slide on the pin 36 and to the left as viewed in FIGS. 3 and 5. The bracket 38 has a slot 43 which receives a roll pin 44 on the end of the pin 36. Thus the slot 43 and the pin 44 provide a lock or a stop for positioning the bracket 38 on the pin 36 in the two diametrically opposite positions mentioned later. A compression spring 46 is disposed between the arm 33 and the bracket 38 to yieldingly urge the bracket 38 to the right in FIGS. 3 and 5, and to therefore cause the bracket slot 43 to surround the pin 44 and therefore lock the wiper 27 in one of the two selected positions.

FIG. 4 therefore shows that the wiper blade 27 can be placed in the solid line position shown, and such position would place the tip 47 of the blade rubber portion 48 against the windshield 11. FIG. 4 also shows the wiper blade 27 in the upper position in dot-dash lines, and this position is achieved by sliding the bracket 38 to the left in FIGS. 3 and 5 to relieve the slot 43 from the pin 44 and to then permit the bracket 38 to be rotated on the pin 36 and to the dot-dash line position in FIG. 4. Also, in this inoperative or upper position, the slot 43 again engages the ends of the pin 44 to lock the wiper blade 27 in this inoperative position. FIG. 3 shows dot-dash lines for the shifting or sliding of the bracket 38 for releasing the lock formed by the notch 43 and pin 44.

In this context, the bracket 38 and the attending parts described for rotating the wiper blade 27 is a selective positioner, and it includes a stop or holder portion formed by the notch 43 and pin 44, for both the operative and the inoperative positions of the wiper blade 27. In the inoperative position, it is therefore significant to mention that the wiper blade 27 is spaced further from the windshield than the air conduit 16 is spaced, and thus the wiper blade 27 does not in any way interfere with the removal of the dust from the windshield when air is blowing through the air conduit 16. Also, the air conduit 16 is provided with holes 26 spaced all along the length of the conduit 16, as indicated in FIG. 6. Also, in a conventional arrangement, the blower 22 can be provided with a switch or control 49 for selective operation of the blower 22 when it is desired to have the pressurized air flow through the air conduit 16.

What is claimed is:

1. In a vehicle windshield cleaner for reciprocal motion across a vehicle windshield, an air conduit reciprocally mounted and extending along and spaced from said vehicle windshield, an air blower and an air line connected with said air conduit for supplying pressurized air to the inside said air conduit, said air conduit being arranged with an air exhaust for directing the pressurized air onto said windshield to blow dust off said windshield, a wiper blade, pivot mounting means connecting said wiper blade to said air conduit and with said wiper blade extending across the space between said conduit and said windshield for reciprocation of said wiper blade across said windshield and in contact with said windshield, a selective positioner included in said pivot mounting means for selectively pivoting said wiper blade out of contact with said windshield.

2. The windshield cleaner of claim 1, wherein said selective positioner includes a holder portion for releasably aligning said wiper blade in contact position on said windshield and for releasably holding said wiper blade out of contact with said windshield.

3. The windshield cleaner of claim 2, wherein said holder portion includes alignment means for selectively positioning said wiper blade further away from said windshield than the distance said air conduit is from the windshield.

References Cited

UNITED STATES PATENTS 1,763,153   6/1930   Hobbins _____ 15—250.04

FOREIGN PATENTS 1,073,999   3/1954   France.

ROBERT W. MITCHELL, Primary Examiner

U.S. Cl. X.R.

15—250.4